United States Patent [19]

Strassel et al.

[11] Patent Number: 5,242,976
[45] Date of Patent: Sep. 7, 1993

[54] COMPOSITION FOR IMPROVING ADHESION OF VINYLIDENE POLYFLUORIDE AND NON-COMPATIBLE POLYMERIC RESINS

[75] Inventors: Albert Strassel, Oullins; Gilbert Duperray, Civrieux D'Azergues; Philippe Rocher, Vernaison, all of France

[73] Assignee: Societe Atochem, Puteaux, France

[21] Appl. No.: 659,019

[22] Filed: Feb. 21, 1991

[30] Foreign Application Priority Data

Mar. 2, 1990 [FR] France .................. 90 02674

[51] Int. Cl.$^5$ .............................. C08L 51/04
[52] U.S. Cl. ............................ 525/72; 525/83; 525/85; 525/199
[58] Field of Search .......... 525/83, 85, 72, 199

[56] References Cited
U.S. PATENT DOCUMENTS 4,508,875  4/1985  Kishida et al. .................. 525/308

Primary Examiner—John C. Bleutge
Assistant Examiner—D. Aylward
Attorney, Agent, or Firm—Burgess, Ryan & Wayne

[57] ABSTRACT

A composition is provided which is coextrudable with vinylidene polyfluoride permitting it to adhere to incompatible polymeric resins, the composition which has a base of an alkyl polymethacrylate and a thermoplastic polymer is comprised of:

from 27 to 50 parts by weight of an alkyl polymethacrylate; and from 73 to 50 parts by weight of an additive itself constituted for 100 portions by weight of additive of:

from 35 to 50 parts by weight of PVDF, and from 65 to 50 parts by weight of acrylic or methacrylic elastomer.

This composition serves to produce vinylidene polyfluoride compounds capable of coating polymers which are non-compatible with vinylidene polyfluoride. When used as an adhesion agent, one can obtain by coextrusion, compounds of vinylidene polyfluoride and polymers non-compatible with the vinylidene polyfluoride.

10 Claims, No Drawings

COMPOSITION FOR IMPROVING ADHESION OF VINYLIDENE POLYFLUORIDE AND NON-COMPATIBLE POLYMERIC RESINS

BACKGROUND OF THE INVENTION

1) Field of the Invention

This invention relates to a composition having a base of vinylidene polyfluoride (PVDF), an alkyl polymethacrylate and an acrylic and/or methacrylic elastomer coextrudable with the PVDF, which permits the adhesion of the latter to a polymeric resin incompatible therewith. The invention also relates to the coextrusion products of the composition with the PVDF and the compounds directly obtained by coextrusion of PVDF and thermoplastic resin incompatible with the PVDF, the composition serving as an adhesion agent.

2) Description of the Related Art

P.D. Frayer in 34th Annual Tech. Conference SPE (1976), Vol. 22, pages 89–90, points out that two incompatible polymers can adhere one to the other when coextruded with a copolymeric agent compatible with each one of them. If Frayer provides the concept of coextrusion to make non-compatible polymers adhere to each other, he does not define which polymers allows said adhesion. Everyone knows that fluorinated resins, and more particularly the PVDF, are not especially compatible with other thermoplastic resins and that it is not sufficient to say that the coextrusion of a fluorinated resin with a third compatible component allows a convenient adhesion with said thermoplastic resins. In FR 2,436,676, there is described a process of manufacture of a composite material PVDF-thermoplastic polymer non-compatible with the PVDF consisting in a coextrusion of the two components with an alkyl polymethacrylate or a mixture of at least 75% by weight of an alkyl polymethacrylate with another undefined polymer as the agent. It has been observed that even though said technique effectively allows one to obtain, by virtue of the PVDF, a good surface protection of the layers of thermoplastic resins, their resistance to shock and their long-range firmness with respect to humidity are mediocre.

By way of example, a layer of acrylonitrile-butadiene-styrene resin coated with a PVDF film obtained according to the method of Example 1 of FR 2,436,676 with a film of methyl polymethacrylate as the agent initially shows an excellent interlayer adhesion above 2500 N/m. This adhesion becomes poor: 480 N/m after a 400-hour exposure at 75° C. in an atmosphere saturated with water. Besides, the resistance to shock is only on the order of from 300 to 380 Kj/m$^2$. Even though methyl polymethacrylate is known for its compatibility with PVDF and other polymers, it appears that this compatibility according to Frayer, if it is necessary, is not sufficient to define a good adhesion.

SUMMARY OF THE INVENTION

The composition according to the present invention which is extrudable with PVDF allows the production of composite materials with polymeric resins which are non-compatible with PVDF, but which possess a good resistance to shock and have an excellent resistance to humidity between layers. During the coextrusion with the PVDF, the composition has the added feature of becoming distributed and spread very easily over the whole surface of the PVDF, which greatly influences the appearance.

The composition coextrudable with PVDF has a base of an alkyl polymethacrylate and PVDF and is comprised of:

1) from 27 to 50 parts by weight of an alkyl polymethacrylate; and
2) from 73 to 50 parts by weight of an additive which itself is comprised of, based on 100 parts by weight of additive;
   a) from 35 to 50 parts by weight of PVDF; and
   b) from 65 to 50 parts by weight of an acrylic or methacrylic elastomer.

DESCRIPTION OF THE PREFERRED EMBODIMENTS

Even though methyl polymethacrylate is the alkyl polymethacrylate simplest to use in the composition, alkyl polymethacrylates containing from 1 to 22 carbon atoms can also be employed. Under the designation alkyl polymethacrylate, there are likewise understood the non-elastomeric copolymers having in the polymeric chain at least 30% by weight of methacrylic residue. There can likewise be associated with the methacrylic monomer at least one ethylenically unsaturated monomer such as styrene, alpha methyl-styrene, acrylonitrile, methacrylonitrile, acrylic acid or methacrylic acid.

In a manner already known, excellent results are obtained with the alkylpolymethacrylate whose apparent viscosities are preferably comprised between the limits indicated for a speed gradient given herebelow and measured at 200° C. However, these values are not limiting, inasmuch as one skilled in the art has the possibility of modifying the viscosities as a function of the extrusion temperature.

| Speed Gradient sec$^{-1}$ | Value of the Apparent Viscosities in Pa.s. | |
| --- | --- | --- |
|  | Minimum | Maximum |
| 3.54 | 4 000 | 50 000 |
| 11.81 | 2 000 | 28 000 |
| 35.4 | 1 125 | 15 000 |
| 118 | 551.50 | 8 000 |
| 354 | 300 | 5 000 |
| 1,181 | 150 | 2 000 |

The PVDF that is employed in the coextrudable composition is generally a homopolymer, but the term PVDF also comprises copolymers containing at least 70% by weight of vinylidene fluoride in copolymerized form. It has been observed that all PVDFs give satisfactory results. The best results are obtained with a PVDF preferably within a range of apparent viscosity at 200° C. such that it has at least for two speed gradients of the table that follows, apparent viscosities respectively included between the two extreme apparent viscosities indicated.

| Speed Gradient sec$^{-1}$ | Value of the Apparent Viscosities in Pa.s. | |
| --- | --- | --- |
|  | Minimum | Maximum |
| 3.54 | 3 000 | 20 000 |
| 11.81 | 1 800 | 9 300 |
| 35.4 | 1 100 | 4 700 |
| 118 | 650 | 2 100 |
| 354 | 390 | 1 000 |

| Speed Gradient | Value of the Apparent Viscosities in Pa.s. | |
|---|---|---|
| sec$^{-1}$ | Minimum | Maximum |
| 1,181 | 230 | 450 |

The apparent viscosities taken into account in this invention are measured in a known manner by means of a capillary rheometer taking into consideration the RABINOWITCH correction applied to non-newtonian liquids.

The acrylic or methacrylic elastomer, the third component of the composition, is either a grafted acrylic elastomer or grafted methacrylic elastomer, it being understood that by said designations are meant mixtures thereof or the acrylic-methacrylic copolymers thereof, or an elastomer with a base of conjugated diene grafted by an acrylic or methacrylic compound. The grafted acrylic or methacrylic elastomer, in order to have the convenient elastomer characteristics, has a vitreous transition temperature lower than $-10°$ C. The elastomer having a base of conjugated diene is selected among the grafted copolymers derived from a conjugated diene or from an alkyl methacrylate and/or an alkyl acrylate.

Among the conjugated dienes employed in the composition of the elastomer, butadiene is the one most often selected. The diene appears most frequently in the form of a copolymer with styrene, such as a butadiene styrene copolymer. Among the thermoplastic elastomers especially preferred are the alkyl methacrylic-butadiene styrene (MBS) esters and the alkyl acrylic-butadiene-styrene esters.

Among the alkyl methacrylic esters can be cited, in particular, the methyl methacrylic-butadiene-styrene esters, the ethyl methacrylic-butadiene-styrene esters, the butyl methacrylic-butadiene-styrene esters, and the lauryl methacrylic-butadiene-styrene esters. In the case of alkyl acrylic-butadiene-styrene esters, there can be cited those derived from methyl, ethyl, butyl or ethyl-2 hexyl acrylates. There can likewise be cited, as thermoplastic elastomers convenient in the composition, the grafted copolymers comprising a major portion consisting of a random copolymer of a conjugated diene and of an alkyl acrylate generally having from $C_1$-$C_{12}$, upon which are grafted chains of an alkyl methacrylate copolymer generally having $C_1$-$C_8$, and an alkyl acrylate copolymer having $C_1$-$C_8$, the main copolymer being in addition apt to include patterns derived from a cross-linking agent containing at least two groups

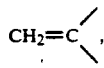

such copolymers having been described, for example, in French Patent Nos. 83 13997 and 83 13990, the contents of which are incorporated by reference.

Among the grafted acrylic elastomers or grafted methacrylic elastomers, there can be cited the alkyl polyacrylates or alkyl polymethacrylates, or the copolymers thereof grafted by an alkyl methacrylate or an alkyl acrylate. By way of example, there can be cited the grafted copolymers comprising a main body consisting of a polymer or copolymer of an alkyl acrylate or an alkyl methacrylate, preferably having $C_1$-$C_8$, upon which are grafted, chains of a polymer or copolymer of an alkyl acrylate or an alkyl methacrylate generally different from that of the main body, having $C_1$-$C_8$. Among said elastomers, there and preferably having $C_1$-$C_8$. Among said elastomers, there can be cited butyl polyacrylate grafted with methyl polymethacrylate.

The thermoplastic elastomers used in the invention can be defined as polymers or copolymers which, naturally, without deposit of plasticizer, possess a rubbery behavior under slight deformation. The rubbery behavior can be characterized by an elongation to the threshold of flow above 20%. The elongation to threshold of flow, as opposed to the elongation to rupture, is defined in the norms ASTM D638-86 and D-638M-84. These thermoplastic elastomers generally have a module of elasticity in flexion below or equal to 800 MPa at room temperature.

This coextrudable composition is prepared in the customary manner, for example, by kneading in the heated state the three components in proportions selected in a threaded mixer followed by a granulation.

As previously indicated, this composition is applied to the PVDF in the heated state by coextrusion. The PVDF corresponds to the definition given above. It can be identical with or different from that used in the composition. This coextrusion is carried out using known equipment and methods. The equipment needed to coextrude the PVDF and the composition is equipped with extruders, die and preferably, a distributor of flow. The thickness of each layer is adjusted by the yield of each one of the extruders.

In the practice of the invention, the temperature of the die is comprised of between 180° and 280° C., the temperature depending on the coextruded materials. The temperatures of the extruders are those customarily provided in the case of the simple extrusion of each one of the polymers.

In order that the final cohesion between each one of the components be well ensured, it is recommended to proceed to their coextrusion in a manner such that the materials exiting from the extruders be gathered together at the latest at the level of the lips of the die. In certain cases, the cohesion obtained may not be as desired, for which reason it is preferable that the flows of each one of the components exiting from the extruder advance together and be in contact for a certain length prior to reaching the lips of the die. In the latter case, instead of a die of several ducts, there is interposed a flow distributor between the outlet of the extruders and a die having a single duct.

The thickness of the layer of composition according to the invention upon the PVDF is usually from 10 to 300 microns. It is, in general, not advisable to make the layer thicker on account of the importance that the different elements of the composition would assume in the mechanical properties of the whole.

The thickness of the layer of PVDF is, in principle, unimportant, but since PVDF is meant to serve essentially as a protective layer of a surface of non-compatible thermoplastic resin, it is preferably for reasons of economy to obtain with the composition a composite material in which the thickness of the PVDF layer is comprised between 10 and 150 microns.

The composite extruded, PVDF composition defined above, is used for protecting surfaces of thermoplastic polymers not compatible with the PVDF thus forming a composite material PVDF-thermoplastic polymer not compatible with the PVDF. This protection can be accomplished by depositing in the heated state on an object of thermoplastic polymer. It can be equally accomplished by injecting a thermoplastic polymer not compatible with the PVDF in a mold where the composite has been placed, the PVDF side opposite the surface of the mold.

It is likewise possible to shape a thermosettable resin not compatible with the PVDF in a mold where the composite has been placed, the PVDF side opposite the surface of the mold or also to fix in the heated state by depositing a thermosettable polymer upon a PVDF treated according to the invention.

If there is not added with the adaptation, it involves a supplementary extruder for the thermoplastic polymer not compatible with the PVDF, all the other conditions such as equipment and production described above remaining unchanged, it is possible and even desirable for the manufacture of coextruded objects such as plate, tubes and streamlines to coextrude directly the PVDF and the non-compatible thermoplastic polymer with the coextrudable composition of the invention as adhesion binder. According to this method, there is directly obtained by coextrusion a composite material PVDF-non-compatible thermoplastic polymer. As a variant, always by extrusion and by means of at least three extruders, there is obtained the composite material according to three components and five layers: PVDF-coextrudable composition-thermoplastic polymer not compatible with the PVDF-coextrudable composition-PVDF.

The thermoplastic polymer not compatible with the PVDF, the copolymers being also comprised under said designation, can be among others a chlorinated vinyl polymer such as a vinyl or vinylidene polychloride, a styrenic polymer such as a polystyrene or a polystyrene choc, a polycarbonate, a polyurethane, a grafted acrylic styrene-acrylonitrile-elastomer copolymer, or an acrylonitrile-butadiene-styrene copolymer. Among the thermosettable polymers not compatible with the PVDF can be cited: the compact and expanded polyurethane and polyurethane-urea resins, the polyester resins, epoxy resins and phenolic resins, the same as vulcanizable rubbers. The thickness of the layer of this thermoplastic polymer can vary, and depends on the thickness of the final object desired to be produced. In a common manner, this thickness can fluctuate from a few tens of microns to a few tens of millimeters, in this case, for example, of layers or massive objects.

The examples that follow illustrate the invention without limiting it.

The resilience tests have been carried out according to the norm DIN 53435.

The adhesion tests have been carried out on test tubes of 25 mm×180 mm.

The film is lifted from the substrate, if possible, and each element is clamped between the jaws of a dynamometer. The drawing speed is of 250 mm/minute. The calculated energy $$W = \frac{resistance}{width\ of\ cover\ face}$$

is expressed in Newton per meter.

Resistance to humidity is measured in accelerated test on a newly produced layer. In the tests of Examples 1 and 2, the layer is placed in water-saturated atmosphere for 400 hours at 75° C. prior to measuring.

EXAMPLE 1

To prepare a composite acrylonitrile-butadiene-styrene (ABS)-PVDF, there are used three extruders SMTP-KAUFMAN. The first one, equipped with a degasification system, has a diameter of 120 mm and a thread length equal to 33 times its, diameter; it is used to extrude the ABS. The second, having a diameter of 50 mm (sur. 2×50), is used for the coextrudable composition. The third one, having a diameter of 40 mm, is used for the PVDF.

These three extruders feed a flow-distributor cylinder fastened to an ordinary flat die designed to produce a plate of about 4 mm thickness and followed by a calender and a classical drawing carriage for the extrusion of plates.

The ABS used in an ARADUR T 723 ® in Tests 1 to 14 and 48 to 50 or a CYCOLAC X 399 ® for Tests 45 to 47 and 51 to 56.

The final PVDF layer on the composite is about 150 microns.

The PVDF used in the coextrudable compositions are:

FORAFLON 4000 ® in Tests 1 to 41, 43 to 45 and 51 to 56 or FORAFLON 5050 ® Tests 42, 46 and 48 to 50.

The PMMA used in the coextrudable compositions is of ALTULITE ® 2654 for Tests 1 to 44 and 48 to 56 or RESARIT ® KOX 125 for Tests 45 to 47.

The apparent viscosities at 200° C. of the different products are the following:

| Speed Gradient sec$^{-1}$ | 3.54/sec$^{-1}$ | 354/sec |
|---|---|---|
| ARADUR T 723[(1)] | 13 500 | 500 |
| CYCOLAC X 399 | 15 700 | 600 |
| FORAFLON 4000 | 10 000 | 700 |
| FORAFLON 5050 | 7 700 | 750 |
| ALTULITE 2654 | 6 900 | 500 |
| KOX 125 | 30 000 | 2 100 |

The coextrudable compositions have been obtained by mixing the components, then drying in an oven under vacuum for 1 hour at 70° C., in a mixer of the TURBULA type for 15 minutes. The mixture is then extruded in reeds which are cut in granules.

The formulae of the compositions with the results are found on the table shown later.

An acrylonitrile-butadiene-styrene elastomer sold by ATO Iberica, Barcelona, Spain.

The heating temperatures of the extruders are given in stages from 190° to 210° C. for the ABS, from 170° to 240° C. for the coextrudable composition, and from 180° to 220° C. for the PVDF. The flow distributor and the die are at 210° C. The film is received between the cylinders of a calender heated to 80° C. The total output is of about 300 kg/h. The outputs of the three extruders are adjusted so as to obtain finally a composite comprising the ABS in 3 mm thickness, the coextrudable composition according to the table herebelow, and the PVDF in 100 microns.

The spreading effect of the composition in the coextrusion on the PVDF is of primary importance to ensure the final appearance of the composite. In the table herebelow, the spreading is classified in excellent, medium and poor. The excellent spreading means that is occurs regularly without waves over all the surface; in this case, the surface PVDF is smooth and without fault in appearance. The medium spreading means that is takes place over all the surface, but there appears waves that thus produce irregularities in the thickness of the composition; in this case, the surface of PVDF is no longer smooth, which causes unacceptable defects in the appearance of the surface. Poor spreading means that the composition spreads only on part of the surface of the PVDF or of the non-compatible polymer in the case of its direct coextrusion; in this case, there are not only defects in the appearance, but also in the adhesion.

In the table herebelow:

Tests 1 and 2 show that the absence of elastomer in the coextrudable composition does not result in the production of a suitable composite;

Tests 3 and 4 show that the non-thermoplastic, micronized, vulcanizable rubbers are not suitable for a good coextrudable composition;

Tests 5 and 6 show that the non-acrylic or methacrylic styrene-butadiene elastomers are not suitable for a good coextrudable composition;

Tests 7 and 8 show that the copolymer elastomers block ether-ester are not suitable for a good coextrudable composition;

Test 9 shows that an ethylene-anhydride maleic-acrylate elastomer is not suitable for a good coextrudable composition;

Test 10 shows that a polyester elastomer with free carbonyl groups is not suitable for a good coextrudable composition;

Tests 11 and 12 show that a copolyamide elastomer is not suitable for a good coextrudable composition;

Test 13 shows that the acrylic elastomers are not suitable when the composition contains no PVDF;

Test 14 shows that an acrylic elastomer on an ethylene base is not suitable for a good coextrudable composition;

Test 15 shows that a methacrylate elastomer of methyl-butyl methacrylate is not suitable for a good coextrudable composition when the composition contains no PVDF;

Tests 16-21 show that the acrylic or methacrylic elastomers are not suitable when the composition contains no PVDF;

Test 22 shows that the EPDMs are not suitable for a good coextrudable composition;

Tests 23-26 show that the polyurethane elastomers are not suitable for a good coextrudable composition;

Tests 27-30 show that the vinyl ethylene-acetate elastomers are not suitable for a good coextrudable composition;

Test 31 shows that the vinyl ethylene-CO-acetate elastomers are not suitable for a good coextrudable composition;

Test 32 shows that the polyether block-amide elastomers are not suitable for a good coextrudable composition;

Tests 33-37 show that the resins and the acrylonitrile-butadiene-styrene (ABS) elastomers associated or not with PVDF are not suitable for a good coextrudable composition;

Test 38 shows that the thermoplastic polyurethanes are not suitable: hydrolysis with loss of adhesion under humidity;

Tests 39 and 50 show that an MBS used according to the formula of the composition is suitable;

Test 40 shows that a maleic ethylene-anhydride elastomer is not suitable even if used according to the characteristics of the composition;

Tests 41 and 42 show that without the presence of elastomer in the composition, good results cannot be obtained: poor resistance to shock;

Tests 43-46 are suitable and show the interest of the acrylic elastomers according to the definitions given;

Test 47 shows PMMA alone is not suitable;

Test 48 shows the interest of the acrylic elastomer according to the invention;

Test 49 shows that polyurethane is not suitable: hydrolysis and loss of adhesion;

Tests 51 and 52 according to the invention give good results; and

Tests 53-56, not corresponding to the intervals of the formula, give poor results.

The elastomers set forth in the following table are identified as follows:

| | |
|---|---|
| ULTRAFINE R20 th | non-thermoplastic vulcanized |
| BUTACRYL HT 289 | rubbers sold by Produits Chimiques Ugine Kuhlmann, Paris, France. |
| STEREON | styrene-butadiene elastomers. |
| KRATON FG 1901 X | Maleic anhydride copolymer sold by Shell Chemical Co., Oak Brook, Ill. |
| HYTREL 4056 | ether-ester elastomers blocks |
| HYTREL 7246 | marketed by E. I. Dupont, Wilmington, Delaware. |
| LODATER | a maleic-acrylate ethylene-anhydride elastomer sold by Atochem, Paris, La Defense, France. |
| GRILESTA P7305 | a polyester elastomer with free carbonyl groups sold by Emser Werke A. G., Zurich, Switzerland. |
| GRILOMELT 648G | copolyamide elastomers sold by Emser |
| GRILOMELT 574B | Werke A. G., Zurich, Switzerland. |
| DURASTRENGTH D200 | an acrylic elastomer sold by M & T Chemicals Inc., Rahway, N.J. |
| LUPOLEN A 2910 MX | an elastomer of ethylene grafted acrylate sold by BASF, Ludwigshafen, Germany. |
| NEOCRYL B725 | is a methyl methacrylate-butyl methacrylate elastomer sold by ICI, Waalwijk, Netherlands. |
| PARALOID KM323B | acrylic or methacrylic elastomers |
| PARALOID KM 653 | marketed by Rohm and Haas Co., |
| PARALOID EXL 2300 | Philadelphia, Pa. |
| PARALOID EXL 2607 | |
| METABLEN C 201 | an important modifier sold by Metco, Philadelphia, Pa. |
| CRYOLITE G20 | acrylic-styrene-butadiene polymer sold by Rohm GmbH, France. |
| EPDM | a modified ethylene-propylene diene marketed by Exxon Chemical. |
| ESTANE 58300 | polyurethane elastomers sold by B. F. Goodrich Co., Cleveland, Ohio. |
| DESMOPAN 720 | polyurethane elastomer sold by Bayer AG, Germany |
| ELASTOLLAN 80A | polyurethane elastomers sold by |
| ELASTOLLAN P8513 | Elastogran Polyurethane GmbH, (BASF Group) Lemforde, Germany. |
| OREVAC 9003 | vinyl ethylene-acetate elastomers sold by ATO Chemie, Paris, La Defense, France. |
| ELVAX 4310 | ethylene-based resins sold by |
| ELVAX 4355 | E. I. DuPont, Wilmington, Del. |
| LEVAPREN 450P | vinyl ethylene-acetate copolymer sold by Bayer AG, Germany. |
| ELVALOY | vinyl ethylene-CO-acetate elastomer sold by E. I. Dupont, Wilmington, De. |
| PEBAX | an amide polyether block elastomer sold by ATO Chemie, Paris, La Defense, France. |
| NOVODUR A50 | acrylonitrile-butadiene-styrene |
| NOVODUR A90 | resins and elastomers sold by Bayer AG, Germany. |
| BLENDEX 435 | ABS resin sold by Borg Warner |
| BLENDEX 310 | Chemical, G.E. Specialty Chemicals, Parkersberg, W. Va. |
| ARADUR T723 | ABS resin sold by ATO Iberica, |

-continued

| | | |
|---|---|---|
| ESTANE 58271 | Barcelona, Spain.<br>a thermoplastic polyurethane resin | sold by B. F. Goodrich Co., Cleveland, Ohio. |

| | COEXTRUDABLE COMPOSITION | | | | THICKNESS OF COATING COMPOSITION μm | Resilience Kj/m² | RATING<br>2 Excellent<br>1 Average<br>0 Poor | Adhesion in Sec. N/m | Adhesion at Atmospheric Humidity N/m |
|---|---|---|---|---|---|---|---|---|---|
| TEST | Parts by Weight PMMA | Parts by Weight PVDF | Parts by Weight ELASTOMER | Elastomer | | | | | |
| 1 | 100 | — | — | — | 50 | 290 | 2 | >2 500 | 200 |
| 2 | 70 | 30 | — | — | 75 | 450 | 2 | >2 500 | 1 100 |
| 3 | 70 or 50 | — | 30 or 50 | Ultrafine ® R 20 Th | 75 | not measurable | 0 | not measured | — |
| 4 | 70 or 50 | — | 30 or 50 | Butacryl ® HT 28 | 75 | — | 0 | — | — |
| 5 | 70 or 50 | — | 30 or 50 | Kraton ® FG 1901 X | 75 | — | 0 | — | — |
| 6 | 70 | — | 30 | Stereon ® | 75 | — | 0 | — | — |
| 7 | 50 | — | 50 | Hytrel ® 4056 | 75 | 700 | 1 | 650 | 100 |
| 8 | 50 | — | 50 | Hytrel ® 7246 | 75 | 650 | 1 | 650 | 100 |
| 9 | 70 or 50 | — | 30 or 50 | Lotader ® | 75 | 600 to 700 | 1 | 1 200 | 200 |
| 10 | 70 | — | 30 | Grilesta ® P 7305 | 75 | — | 0 | — | — |
| 11 | 70 | — | 30 | Grilomelt ® 648 G | 75 | — | 0 | — | — |
| 12 | 70 | — | 30 | Grilomelt ® 574 G | 75 | — | 0 | — | — |
| 13 | 60 or 50 | — | 40 or 50 | Durastrenght ® D 2000 | 75 | 780 | 1 | 1 800 | 160 |
| 14 | 50 | — | 50 | Lupolen ® A 2910 MX | 75 | — | 0 | — | — |
| 15 | 50 | — | 50 | Neocryl ® B 725 | 75 | 350 | 1 | 1 900 | 250 |
| 16 | 50 | — | 50 | Paraloïd ® KM 323 B | 75 | 750 | 1 | >2 500 | 700 |
| 17 | 50 | — | 50 | Paraloïd ® KM 653 | 75 | 720 | 1 | 2 200 | 450 |
| 18 | 50 | — | 30-50 | Paraloïd ® 2300 | 75 | 720 | 1 | >1 800 | 200 |
| 19 | 70-50 | — | 30-50 | Paraloïd ® EXL 2607 | 75 | 680 | 1 | >2 500 | 150 |
| 20 | 50 | — | 50 | Metablen ® C 201 | 75 | 680 | 1 | >2 500 | 120 |
| 21 | 50 | — | 50 | Cryolite ® G20 | 75 | 500 | 1 | 2 000 | 140 |
| 22 | 70 | — | 30 | EPDM | 75 | — | 0 | — | — |
| 23 | 70 | — | 30 | Estane ® 58300 | 75 | — | 0 | — | — |
| 24 | 50 | — | 50 | Desmopan ® 720 | 75 | — | 0 | — | — |
| 25 | 70 | — | 30 | Elastollan ® 80 A | 75 | — | 0 | — | — |
| 26 | 50 | — | 50 | Elastollan ® P 8513 | 75 | — | 0 | — | — |
| 27 | 70 | — | 30 | Orevac ® 9003 | 75 | 500 | 1 | 1 200 | 300 |
| 28 | 70 | — | 30 | Elvax ® 4310 | 75 | 450 | 1 | 1 200 | 250 |
| 29 | 70 | — | 30 | Elvax ® 4355 | 75 | 480 | 1 | 1 300 | 250 |
| 30 | 70 | — | 30 | Levapren ® 450 P | 75 | 600 | 1 | 1 600 | 850 |
| 31 | 50 | — | 50 | Elvaloy ® | 75 | 400 | 1 | 800 | 200 |
| 32 | 50 | — | 50 | Pebax ® 2533 | 75 | 550 | 1 | 700 | 200 |
| 33 | 70 | — | 30 | Novodur ® A50 | 75 | 450 | 2 | 1 800 | <150 |
| 34 | 50 | — | 50 | Novodur ® A 90 | 75 | 500 | 2 | 1 800 | <100 |
| 35 | 50 | — | 50 | Blendex ® 435 | 75 | 520 | 1 | 1 800 | 250 |
| 36 | 50 | — | 50 | Blendex ® 310 | 75 | 550 | 1 | 1 600 | 200 |
| 37 | 40 | 30 | 30 | Aradur ® T 723 | 75 | 500 | 2 | 1 550 | <150 |

-continued

| TEST | COEXTRUDABLE COMPOSITION | | | | THICKNESS OF COATING COMPOSITION μm | Resilience Kj/m² | RATING 2 Excellent 1 Average 0 Poor | Adhesion in Sec. N/m | Adhesion at Atmospheric Humidity N/m |
|---|---|---|---|---|---|---|---|---|---|
| | Parts by Weight PMMA | Parts by Weight PVDF | Parts by Weight ELASTOMER | Elastomer | | | | | |
| 38 | 35 | 30 | 35 | Estane ® 58271 | 50 | 800 | 1 | >2 550 | 50 |
| 39 | 35 | 30 | 35 | Metablen ® C 201 | 50 | 750 | 2 | 1 960 | 1 800 |
| 40 | 35 | 30 | 35 | Lotader ® | 50 | 750 | 1 | 900 | 720 |
| 41 | 70 | 30 | — | — | 50 | 350 | 2 | >2 500 | >2 500 |
| 42 | 70 | 30 | — | — | 50 | 400 | 2 | >2 500 | >2 500 |
| 43 | 35 | 30 | 35 | Dura-strenght ® D 200 | 50 | 850 | 2 | >2 500 | >2 500 |
| 44 | 35 | 30 | 35 | Paraloïd ® EXL 2300 | 50 | 780 | 2 | >2 500 | >2 500 |
| 45 | 35 | 30 | 35 | Paraloïd ® KM 323 B | 50 | 900 | 2 | >2 500 | >2 500 |
| 46 | 35 | 30 | 35 | Paraloïd ® KM 323 B | 50 | 850 | 2 | >2 000 | >2 000 |
| 47 | 100 | — | — | — | 75 | 370 | 2 | >2 500 | 480 |
| 48 | 35 | 30 | 35 | Dura-strenght ® D 200 | 50 | 980 | 2 | >2 500 | >2 500 |
| 49 | 35 | 30 | 35 | Estane ® 58300 | 50 | 800 | 1 | >2 500 | 250 |
| 50 | 35 | 30 | 35 | Metablen ® C 201 | 50 | 700 | 2 | 2 100 | 1 900 |
| 51 | 35 | 30 | 35 | Dura-strenght ® D 200 | 50-70 | 950 | 2 | >2 500 | >2 500 |
| 52 | 30 | 35 | 35 | Dura-strenght ® D 200 | 50-70 | 950 | 2 | >2 500 | 2 100 |
| 53 | 25 | 35 | 40 | Dura-strenght ® D 200 | 50-70 | 980 | 1 | 1 500 | 1 200 |
| 54 | 20 | 35 | 45 | Dura-strenght ® D 200 | 50-70 | — | 0 | — | — |
| 55 | 60 | 20 | 20 | Dura-strenght ® D 200 | 50-70 | 450 | 2 | >2 500 | 1 200 |
| 56 | 30 | 60 | 10 | Dura-strenght ® D 200 | 50-70 | 620 | 2 | 1 000 | 900 |

EXAMPLE 2

For producing a polycarbonate-PVDF composite, three extruders are used:

One SAMAFOR monothread of 120 mm for the polycarbonate (Macrolon ® 310);

One ANDOUARD B30 for the coextrudable composition; and

One FAIREX B30 for the PVDF (Foraflon200 4000).

A box of flow distribution type KAUFMAN, a calender with three cylinders respectively heated from high to low at 20° C., 140° C. and 120° C., a SAMAFOR die 800 mm wide heated at 200°-220° C. completing the equipment.

The coextrudable composition prepared in the conditions of Example 1 is constituted of parts by weight of:
35 (Resarit ® KOX 125);
30 (Foraflon ® 4000); and
35 grafted acrylic elastomer (Paraloid ® KM 323 B).

The extrusion temperatures are of 260°-280° C. for the polycarbonate and of 240° C. for the PVDF and the composition, the flow distributor being at a temperature of 250° C. In the composite obtained, the polycarbonate thickness is of 3 mm, the thicknesses of the composition and of the PVDF being respectively of 100 μm and 150 μm.

The examination results of this composite are the following:
Resilience : not measurable: too elevated
Adhesion prior to humid aging : 2 500 N/m
Adhesion after humid aging : 2 500 N/m
Spreading : 2

EXAMPLE 3

Two extruders are used connected to a classical die allowing to coextrude and inflate a sheath or a film.

A FAIREX B30 extruder contains the PVDF.

An ANDOUART extruder having a diameter 30 contains the adhesion layer.

Said two extruders and the die are heated to between 200 and 220° C.

Two films are produced, one has the following composition:

A—PVDF (FORAFLON ® 400 containing 5% zinc oxide and 5% antimony oxide)—adhesion layer : PMMA (ALTULITE ® 2654); the other:

B—PVDF (FORAFLON ® 4000 contains 5% zinc oxide and 5% antimony oxide)—adhesion layer having the following composition:
PMMA (ALTULITE ® 2654) : 30% by weight Acrylic Elastomer (DURASTRENGTH ® D200) : 35
PVDF (FORAFLON ® 4000) : 35

The two films A and B have a total thickness of 120 microns (70 microns of PVDF and 50 microns of adhesion composition).

By means of a machine, high pressure for polyurethane is simultaneously flowed to the two components.

133 parts by weight of a prepolymer having a base of diphenyl diisocyanate and of dipropylene glycol having 6.2 free functions NCO per kg; and 138.05 parts by weight of a mixture containing in parts by weight:

100 of oxyethylated polyoxypropylene triol of index of OH=28

2 of trimethylol propane
30 of monoethylene glycol
2 of triethylene diamine
0.05 of tin dibutyl dilaurate
4 of methylene chloride This mixture is discharged in a mold brought to 75° C., in which either the film A or the film B, PVDF side, is placed against the wall of the mold.

There is obtained after 3 minutes a molded piece of polyurethane foam coated with a PVDF film A or B, which is strongly adherent and of fine appearance.

There is carried on both pieces A and B, to show that they are respectively coated by the film A and B, a shock test consisting of dropping a 1.5 Kg weight from a height of 1 m.

The piece A shows a loosening of the film and a cracking of the PVDF film at the place of the shock.

The piece B preserves its surface appearance.

Both samples A and B are subjected to a test consisting of leaving them 400 hours in an enclosure at 60° C. and 100% humidity. After this period, it is observed that the PVDF film of sample A has a resistance to delaminating of only 400 N/m, whereas on sample B, the adhesion remains perfect: 2 500 N/m.

What is claimed is:

1. A composition coextrudable with polyvinylidene di fluoride to adhere said poly vinylident di fluoride to incompatible polymeric resins, said composition having a base of a poly (alkylmethacrylate) and a thermoplastic polymer which comprises: a mixture, based on 100 parts of the mixture, of
    1) from 27 to 50 parts by weight of a non-elastomeric poly(alkylmethacrylate); and
    2) from 73 to 50 parts by weight of an additive comprised of:
        a) from 35 to 50 parts by weight of polyvinylidene difluoride per 200 parts of additive, and
        b) from 65 to 50 parts by weight of acrylic or methacrylic elastomer per 100 parts of additive.

2. A composition according to claim 1, wherein said acrylic or methacrylic elastomer has an elongation to the flow threshold of more than 20%.

3. A composition according to claim 1, wherein said acrylic or methacrylic elastomer has a vitreous transition temperature of less than −10° C.

4. A composition according to claim 1, wherein said acrylic or methacrylic elastomer is selected form the group consisting of (a) a grafted acrylic or methacrylic elastomer and (b) an elastomer having a base of conjugated diene grafted by an acrylic and/or methacrylic compound.

5. A composition according to claim 4, wherein said conjugated diene is butadiene.

6. A composition according to claim 4, wherein the diene is in the form of copolymer with styrene.

7. A composition according to claim 4, wherein said acrylic or methacrylic elastomer is selected from the group consisting of alkylmethacrylic-butadiene-styrene copolymers, and the grafted copolymers comprising a random copolymer of a conjugated diene and of an alkylacrylate having from 2 to 12 carbon atoms in the alkyl group upon which are grafted chains of a copolymer of alkylmethacrylate having from 1 to 4 carbon atoms in the alkyl groups and/or alkylacrylate having from 1 to 8 carbon atoms in the alkyl groups.

8. A composition according to claim 4, wherein said grafted acrylic or methacrylic elastomer is an polyacrylate or alkyl poly(alkylacrylate) or poly(alkylmethacrylate) or one of the copolymers thereof, grafted by an alkyl methacrylate or an alkyl acrylate in the form of polymer or copolymer.

9. A composition according to claim 8, wherein said grafted acrylic or methacrylic elastomer is a grafted copolymer comprising a polymer or copolymer of alkyl acrylate or alkyl methacrylate upon which are grafted chains of a polymer or a copolymer of alkyl acrylate or alkyl methacrylate different from that of said main body.

10. A composition according to claim 1, wherein said acrylic or methacrylic elastomer has a module of elasticity inflexion less than or equal to 800 MPa at room temperature.

* * * * *